United States Patent
Mizrahi et al.

(10) Patent No.: US 9,208,066 B1
(45) Date of Patent: Dec. 8, 2015

(54) RUN-TIME CODE PARALLELIZATION WITH APPROXIMATE MONITORING OF INSTRUCTION SEQUENCES

(71) Applicant: Centipede Semi Ltd., Netanya (IL)

(72) Inventors: Noam Mizrahi, Hod Hasharon (IL); Alberto Mandler, Zichron Yaakov (IL); Shay Koren, Tel-Aviv (IL); Jonathan Friedmann, Even Yehuda (IL)

(73) Assignee: CENTIPEDE SEMI LTD., Netanya (IL)

( * ) Notice: Subject to any disclaimer, the term of this patent is extended or adjusted under 35 U.S.C. 154(b) by 0 days.

(21) Appl. No.: 14/637,418

(22) Filed: Mar. 4, 2015

(51) Int. Cl.
*G06F 9/45* (2006.01)
*G06F 11/36* (2006.01)
*G06F 9/44* (2006.01)
*G06F 9/30* (2006.01)
*G06F 9/38* (2006.01)

(52) U.S. Cl.
CPC .............. *G06F 11/3688* (2013.01); *G06F 8/70* (2013.01); *G06F 9/30098* (2013.01); *G06F 9/3867* (2013.01)

(58) Field of Classification Search
None
See application file for complete search history.

(56) References Cited

U.S. PATENT DOCUMENTS

| | | | |
|---|---|---|---|
| 5,488,729 A * | 1/1996 | Vegesna et al. | 712/209 |
| 5,488,730 A | 1/1996 | Brown, III et al. | |
| 5,966,537 A * | 10/1999 | Ravichandran | 717/158 |
| 5,974,538 A * | 10/1999 | Wilmot, II | 712/218 |
| 6,035,120 A | 3/2000 | Ravichandran | |
| 6,092,180 A * | 7/2000 | Anderson et al. | 712/200 |
| 6,157,998 A * | 12/2000 | Rupley et al. | 712/238 |
| 6,182,210 B1 | 1/2001 | Akkary et al. | |
| 6,202,205 B1 * | 3/2001 | Saboff et al. | 717/151 |
| 6,308,175 B1 * | 10/2001 | Lang et al. | 707/608 |
| 6,463,522 B1 | 10/2002 | Akkary | |
| 6,493,820 B2 | 12/2002 | Akkary et al. | |
| 6,505,345 B1 * | 1/2003 | Chen | G06F 9/30072 717/154 |
| 6,516,409 B1 | 2/2003 | Sato | |
| 6,658,447 B2 | 12/2003 | Cota-Robles | |
| 6,772,324 B2 | 8/2004 | Akkary et al. | |
| 6,826,752 B1 | 11/2004 | Thornley et al. | |
| 7,065,759 B2 * | 6/2006 | Hank | G06F 8/433 717/154 |
| 7,313,675 B2 | 12/2007 | Latorre et al. | |
| 7,313,676 B2 | 12/2007 | Brekelbaum et al. | |

(Continued)

FOREIGN PATENT DOCUMENTS

EP 2239657 B1 11/2012

OTHER PUBLICATIONS

Moseley, et al., "Identifying Potential Parallelism via Loop-centric Profiling"; 2007 ACM; [retrieved on May 20, 2015]; Retrieved from Internet <URL:http://carbon.ucdenver.edu/~dconnors/papers/cf07-profiling.pdf>;pp. 1-9.*

(Continued)

*Primary Examiner* — Xi D Chen
(74) *Attorney, Agent, or Firm* — D. Kligler I.P. Services Ltd.

(57) ABSTRACT

A method includes, in a processor that executes instructions of program code, identifying a region of the code containing one or more segments of the instructions that are at least partially repetitive. The instructions in the region are monitored, and an approximate specification of register access by the monitored instructions is constructed for the region. Execution of the segments in the region is parallelized using the specification.

30 Claims, 2 Drawing Sheets

(56) References Cited

U.S. PATENT DOCUMENTS

| | | | |
|---|---|---|---|
| 7,366,880 B2 | 4/2008 | Chaudhry et al. | |
| 7,401,329 B2* | 7/2008 | De Rijck | 717/161 |
| 7,478,198 B2 | 1/2009 | Latorre et al. | |
| 7,526,637 B2 | 4/2009 | Jung et al. | |
| 7,596,781 B2* | 9/2009 | Fulton et al. | 717/137 |
| 7,650,485 B1 | 1/2010 | Chou | |
| 7,681,187 B2* | 3/2010 | Ludwig | G06F 8/441 717/153 |
| 7,779,069 B2* | 8/2010 | Frid-Nielsen et al. | 709/203 |
| 7,840,954 B2* | 11/2010 | Gschwind | G06F 8/445 717/153 |
| 7,882,381 B2 | 2/2011 | Wyatt | |
| 8,006,235 B2* | 8/2011 | Broman et al. | 717/130 |
| 8,056,061 B2* | 11/2011 | Lee | G06F 8/41 717/153 |
| 8,166,467 B2* | 4/2012 | Biswas | G06F 8/4442 717/155 |
| 8,181,170 B2* | 5/2012 | Patil | G06F 8/52 717/154 |
| 8,185,882 B2* | 5/2012 | Patel | G06F 8/443 717/153 |
| 8,196,117 B2* | 6/2012 | LaFrance-Linden | 717/130 |
| 8,230,411 B1* | 7/2012 | Vorbach | G06F 8/433 717/155 |
| 8,261,046 B2 | 9/2012 | Gibert et al. | |
| 8,291,197 B2* | 10/2012 | Wu et al. | 712/216 |
| 8,402,429 B2* | 3/2013 | Kielstra | G06F 8/443 717/155 |
| 8,438,370 B1 | 5/2013 | Budge | |
| 8,572,595 B1* | 10/2013 | Lethin | G06F 8/443 717/155 |
| 8,612,949 B2* | 12/2013 | Liao | G06F 8/4442 717/154 |
| 8,667,471 B2* | 3/2014 | Wintergerst et al. | 717/130 |
| 8,677,337 B2 | 3/2014 | Song et al. | |
| 8,719,806 B2 | 5/2014 | Wang et al. | |
| 8,843,901 B2* | 9/2014 | Krajec et al. | 717/130 |
| 9,015,687 B2* | 4/2015 | George | G06T 1/20 717/155 |
| 2002/0144092 A1 | 10/2002 | Topham et al. | |
| 2003/0167460 A1* | 9/2003 | Desai | G06F 1/3228 717/154 |
| 2004/0073906 A1 | 4/2004 | Chamdani et al. | |
| 2004/0098570 A1 | 5/2004 | Giri | |
| 2004/0154010 A1 | 8/2004 | Marcuello et al. | |
| 2004/0193857 A1* | 9/2004 | Miller et al. | 712/240 |
| 2006/0047495 A1 | 3/2006 | Sanchez et al. | |
| 2006/0095732 A1* | 5/2006 | Tran et al. | 712/217 |
| 2006/0227966 A1* | 10/2006 | Knowles | 380/42 |
| 2008/0134196 A1 | 6/2008 | Madriles et al. | |
| 2008/0162272 A1* | 7/2008 | Huang et al. | 705/11 |
| 2008/0163230 A1 | 7/2008 | Latorre et al. | |
| 2008/0167846 A1* | 7/2008 | Bugenhagen | 703/6 |
| 2008/0307403 A1* | 12/2008 | Heishi | G06F 8/441 717/153 |
| 2008/0320276 A1 | 12/2008 | Krottendorfer et al. | |
| 2009/0228690 A1 | 9/2009 | Muff et al. | |
| 2009/0327674 A1 | 12/2009 | Codrescu et al. | |
| 2010/0161948 A1 | 6/2010 | Abdallah | |
| 2010/0269102 A1 | 10/2010 | Latorre et al. | |
| 2011/0161643 A1* | 6/2011 | Eichenberger et al. | 712/241 |
| 2011/0167247 A1* | 7/2011 | Gibbs et al. | 712/240 |
| 2011/0320787 A1* | 12/2011 | Dieffenderfer et al. | 712/234 |
| 2012/0079146 A1* | 3/2012 | Hesse | 710/105 |
| 2013/0125097 A1* | 5/2013 | Ebcioglu et al. | 717/136 |
| 2013/0232476 A1* | 9/2013 | Varma et al. | 717/150 |
| 2014/0019726 A1 | 1/2014 | Toi et al. | |
| 2014/0281435 A1* | 9/2014 | Perkins et al. | 712/227 |
| 2014/0282592 A1* | 9/2014 | Abdallah | 718/104 |
| 2014/0282601 A1* | 9/2014 | Abdallah | 718/106 |
| 2014/0317387 A1 | 10/2014 | Abdallah | |

OTHER PUBLICATIONS

Mishra, Dutt, "Specification-Driven Directed Test Generation for Validation of Pipelined Processors"; 2008 ACM; [retrieved on Sep. 7, 2015]; Retrieved from Internet <URL:http://dl.acm.org/citation.cfm?id=1367045.1367051>pp. 42:1-42:36.*

Rosner, et al., "Power Awareness through Selective Dynamically Optimized Traces"; 2004 IEEE; [retrieved on Sep. 7, 2015]; Retrieved from Internet <URL:http://dl.acm.org/citation.cfm?id=998680.1006715>pp. 1-12.*

Sami, et al., "Exploiting Data Forwarding to Reduce the Power Budget of VLIW Embedded Processors", 2001 IEEE; [retrieved on Sep. 7, 2015]; Retrieved from Internet <URL:http://ieeexplore.ieee.org/stamp/stamp.jsp?tp=&arnumber=915034>pp. 252-257.*

Lazarescu, Lavagno, "Dynamic trace-based data dependency analysis for parallelization of C programs"; 2012 IEEE; [retrieved on Sep. 7, 2015]; Retrieved from Internet <URL:http:http://ieeexplore.ieee.org/stamp/stamp.jsp?tp=&arnumber=6392110>pp. 126-131.*

U.S. Appl. No. 14/578,518 Office Action dated Jun. 19, 2015.

Ortiz-Arroyo et al., "Dynamic Simultaneous Multithreaded Architecture", Proceedings of ISCA's 16th International Conference on Parallel and Distributed Computing Systems (PDCS'03), 9 pages, year 2003.

Ortiz-Arroyo, D.,"Efficient Resource Allocation on a Dynamic Simultaneous Multithreaded Architecture", Computer Science and Engineering Department, Aalborg University, Denmark, 5 pages, year 2006.

Marcuello et al., "A Quantitative Assessment of Thread-Level Speculation Techniques", Proceedings of the 14th International Parallel and Distributed Processing Symposium, pp. 595-601, May 1-5, 2000.

Marcuello et al., "Thread-Spawning Schemes for Speculative Multithreading", Proceedings of the Eighth International Symposium on High-Performance Computer Architecture (HPC02), pp. 55-64, Feb. 2-6, 2002.

Marcuello et al., "Clustered Speculative Multithreaded Processors", Proceedings of the 13th international conference on Supercomputing (ICS '99), pp. 365-372, year 1999.

Marcuello et al., "Speculative Multithreaded Processors", Proceedings of the 12th international conference on Supercomputing (ICS '98), pp. 77-84, year 1998.

Cazorla et al., "Dynamically Controlled Resource Allocation in SMT Processors", Proceedings of the 37th International Symposium on Microarchitecture (Micro-37'04), pp. 171-182, year 2004.

Akkary et al., "A Dynamic Multithreading Processor", Proceedings of the 31st annual ACM/IEEE international symposium on Microarchitecture (Micro-31), pp. 226-236, Dec. 2, 1998.

Ranjan et al., "P-Slice Based Efficient Speculative Multithreading", International Conference on High Performance Computing (HiPC), pp. 119-128, Dec. 16-19, 2009.

Sohi et al., "Speculative Multithreaded Processors", IEEE Computer, vol. 34, issue 4, pp. 66-73, Apr. 2001.

Sohi et al., "Speculative Multithreaded Processors", Computer Sciences Department, University of Wisconsin-Madison, year 2001.

Roth et al., "Register Integration: A Simple and Efficient Implementation of Squash Reuse", Proceedings of the 33rd Annual International Symposium on Microarchitecture (Micro-33), 12 pages, Dec. 10-13, 2000.

Roth, A., "Pre-Execuion via Speculative Data-Driven Multithreading", A dissertation submitted in partial fulfillment of the requirements for the degree of Doctor of Philosophy (Computer Sciences), University of Wisconsin Madison, 375 pages, year 2001.

Jacobson et al., "Path-Based Next Trace Prediction", Proceedings of Micro-30, 11 pages, Dec. 1-3, 1997.

Tubella et al., "Control Speculation in Multithreaded Processors through Dynamic Loop Detection", Proceedings of the 4th International High-Performance Computer Architecture Symposium, pp. 14-23, Feb. 1-4, 1998.

Zier et al., "Performance Evaluation of Dynamic Speculative Multithreading with the Cascadia Architecture", IEEE Transactions on Parallel and Distributed Systems, vol. 21, No. 1, pp. 47-59, Jan. 2010.

(56) References Cited

OTHER PUBLICATIONS

Zier, "The Dynamic Speculation and Performance Prediction of Parallel Loops", Dissertation for the degree of Doctor of Philosophy in Electrical and Computer Engineering, Oregon State University, 146 pages, May 1, 2009.
De Alba et al., "Characterization and Evaluation of Hardware Loop Unrolling", Boston Area Architecture Workshop (Barc-2003), 18 pages, Jan. 2003.
Collins et al., "Clustered Multithreaded Architectures-Pursuing Both IPC and Cycle Time", Proceedings of the 18th International Parallel and Distributed Processing Symposium, 10 pages, Apr. 2004.
Mizrahi et al., U.S. Appl. No. 14/578,518, filed Dec. 22, 2014.
Mizrahi et al., U.S. Appl. No. 14/583,119, filed Dec. 25, 2014.
Patel et al., "rePlay: A Hardware Framework for Dynamic Optimization", IEEE Transactions on Computers, vol. 50, No. 6, pp. 590-608, Jun. 2001.
Shen et al., "Modern Processing Design: Fundamentals of Superscalar Processors", Chapter 4.2, pp. 159-164, Oct. 9, 2002.
U.S. Appl. No. 14/583,119 Office Action dated Apr. 14, 2015.
Mizrahi et al., U.S. Appl. No. 14/578,516, filed Dec. 22, 2014.
Mizrahi et al., U.S. Appl. No. 14/673,889, filed Mar. 31, 2015.
Mizrahi et al., U.S. Appl. No. 14/673,884, filed Mar. 31, 2015.
Mizrahi et al., U.S. Appl. No. 14/690,424, filed Apr. 19, 2015.
U.S. Appl. No. 14/583,119 Office Action dated May 28, 2015.
U.S. Appl. No. 14/578,516 Office Action dated May 21, 2015.
U.S. Appl. No. 14/690,424 Office Action dated Aug. 27, 2015.
U.S. Appl. No. 14/578,516 Office Action dated Oct. 19, 2015.

\* cited by examiner

RUN-TIME CODE PARALLELIZATION WITH APPROXIMATE MONITORING OF INSTRUCTION SEQUENCES

FIELD OF THE INVENTION

The present invention relates generally to processor design, and particularly to methods and systems for run-time code parallelization.

BACKGROUND OF THE INVENTION

Various techniques have been proposed for dynamically parallelizing software code at run-time. For example, Akkary and Driscoll describe a processor architecture that enables dynamic multithreading execution of a single program, in "A Dynamic Multithreading Processor," Proceedings of the $31^{st}$ Annual International Symposium on Microarchitectures, December, 1998, which is incorporated herein by reference.

Marcuellu et al., describe a processor microarchitecture that simultaneously executes multiple threads of control obtained from a single program by means of control speculation techniques that do not require compiler or user support, in "Speculative Multithreaded Processors," Proceedings of the $12^{th}$ International Conference on Supercomputing, 1998, which is incorporated herein by reference.

Marcuello and Gonzales present a microarchitecture that spawns speculative threads from a single-thread application at run-time, in "Clustered Speculative Multithreaded Processors," Proceedings of the $13^{th}$ International Conference on Supercomputing, 1999, which is incorporated herein by reference.

In "A Quantitative Assessment of Thread-Level Speculation Techniques," Proceedings of the 14th International Parallel and Distributed Processing Symposium, 2000, which is incorporated herein by reference, Marcuello and Gonzales analyze the benefits of different thread speculation techniques and the impact of value prediction, branch prediction, thread initialization overhead and connectivity among thread units.

Ortiz-Arroyo and Lee describe a multithreading architecture called Dynamic Simultaneous Multithreading (DSMT) that executes multiple threads from a single program on a simultaneous multithreading processor core, in "Dynamic Simultaneous Multithreaded Architecture," Proceedings of the $16^{th}$ International Conference on Parallel and Distributed Computing Systems (PDCS'03), 2003, which is incorporated herein by reference.

U.S. Patent Application Publication 2014/0282601, whose disclosure is incorporated herein by reference, describes a method for dependency broadcasting through a block-organized source-view data structure. The method includes receiving an incoming instruction sequence using a global front end, and grouping the instructions to form instruction blocks. A plurality of register templates is used to track instruction destinations and instruction sources by populating the register template with block numbers corresponding to the instruction blocks, wherein the block numbers corresponding to the instruction blocks indicate interdependencies among the blocks of instructions. A block-organized source-view data structure is populated, wherein the source-view data structure stores sources corresponding to the instruction blocks as recorded by the plurality of register templates. Upon dispatch of one block of the instruction blocks, a number belonging to the one block is broadcast to a column of the source-view data structure that relates that block, and the column is marked accordingly. The dependency information of remaining instruction blocks is updated in accordance with the broadcast.

SUMMARY OF THE INVENTION

An embodiment of the present invention that is described herein provides a method including, in a processor that executes instructions of program code, identifying a region of the code containing one or more segments of the instructions that are at least partially repetitive. The instructions in the region are monitored, and an approximate specification of register access by the monitored instructions is constructed for the region. Execution of the segments in the region is parallelized using the specification.

In some embodiments, identifying the region includes selecting multiple segments having at least one of a common starting point and a common ending point in the code, and constructing the approximate specification includes constructing the same specification to specify the register access in the multiple selected segments. In an embodiment, identifying the region includes identifying a program loop or a function.

In a disclosed embodiment, the approximate specification is associated with a flow-control trace traversed by the instructions in the segments. In another embodiment, the approximate specification is associated with multiple alternative flow-control traces traversed by the instructions in the segments.

In an example embodiment, constructing the approximate specification includes indicating in the specification identities of registers accessed by the instructions, but not locations of last write operations to the registers. In another embodiment, constructing the approximate specification includes: for one or more first registers, specifying locations in the code of respective last write operations to the first registers; and for one or more second registers, specifying whether the second registers were written to, but not the locations of the last write operations to the second registers. In an embodiment, the first registers include the registers written to up to a predefined number of times, and the second registers include the registers written to more than the predefined number of times.

In yet another embodiment, constructing the approximate specification includes selecting, based on indications embedded in the program code, at least a first register for which the specification is to be approximate, and at least a second register for which the specification is to be exact. In still another embodiment, constructing the approximate specification includes dividing a monitored segment into sections, and, for each section, specifying the registers that were written to in the section and not written to in subsequent sections. In an embodiment, constructing the approximate specification includes dividing a monitored segment into sections, and monitoring the sections using two or more hardware threads.

In some embodiments, constructing the approximate specification includes, for each register in the specification, specifying an approximate location in the code of a last write operation to the register, which is no earlier than an accurate location of the last write operation. Specifying the approximate location may include specifying an approximate number of write commands to the register that is no less than an accurate number of the write commands to the register. Additionally or alternatively, specifying the approximate location may include determining the approximate location based on one or more instructions following a branch that was mispredicted during monitoring of the instructions.

In a disclosed embodiment, constructing the approximate specification includes collecting the register access regardless of possible overlap between the segments in the region. In another embodiment, constructing the approximate specification includes merging the register access with one or more previously-collected specifications.

In some embodiments, constructing the approximate specification includes merging register-access information that was collected in two or more of the segments. In an example embodiment, merging the register-access information includes summing, or taking a maximum of, respective counts of write operations from the two or more segments. Additionally or alternatively, merging the register-access information may include merging respective classifications of registers from the two or more segments.

In an embodiment, the method includes correcting the approximate specification to compensate for branch mis-prediction occurring in the monitored instructions. In another embodiment, constructing the approximate specification includes collecting the register access based on at least one of: instructions being decoded in an execution pipeline of the processor; instructions being executed in the execution pipeline; and instructions being committed in the execution pipeline. In yet another embodiment, monitoring the instructions includes generating at least one flow-control trace of the monitored instructions based on at least one of: instructions being fetched from memory in an execution pipeline of the processor; instructions being decoded in the execution pipeline; and instructions being executed in the execution pipeline, or based on instructions being committed in the execution pipeline.

There is additionally provided, in accordance with an embodiment of the present invention, a processor including an execution pipeline and a monitoring unit. The execution pipeline is configured to execute instructions of program code. The monitoring unit is configured to identify a region of the code containing one or more segments of the instructions that are at least partially repetitive, to monitor the instructions in the region and construct for the region an approximate specification of register access by the monitored instructions, and to parallelize execution of the segments in the region using the specification.

The present invention will be more fully understood from the following detailed description of the embodiments thereof, taken together with the drawings in which:

DETAILED DESCRIPTION OF EMBODIMENTS

Overview

Figure 1:
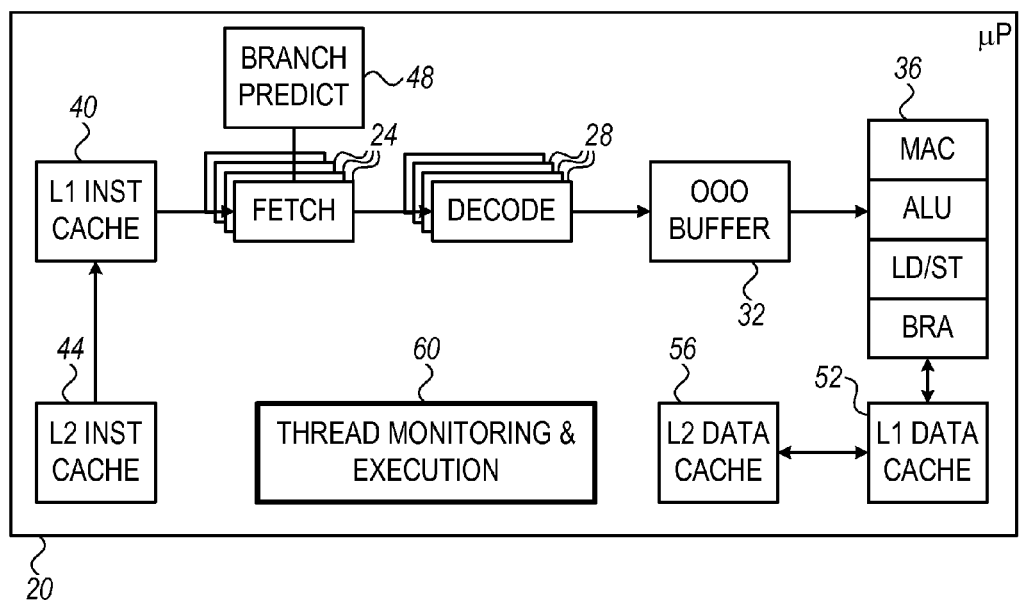
FIG. 1 is a block diagram that schematically illustrates a processor that performs run-time code parallelization, in accordance with an embodiment of the present invention.

Embodiments of the present invention that are described herein provide improved methods and devices for run-time parallelization of code in a processor. In the disclosed embodiments, the processor identifies a region of the code containing one or more segments of instructions that are at least partially repetitive. The processor parallelizes the execution of the identified region using a "scoreboard"—A specification of access to registers by the instructions in the region. For example, the processor may invoke multiple hardware threads to execute respective segments, and decide how and when to parallelize the threads based on the scoreboard.

In some embodiments, the processor specifies in the scoreboard approximate rather than exact register-access information. In various embodiments, the specification is approximate in the sense that some register-access information may be omitted, for at least one of the registers. Additionally or alternatively, the specification may be approximate in the sense that the register-access information is specified at reduced accuracy or resolution. Further additionally or alternatively, the specification may be approximate in the sense that a single specification is associated with multiple different flow-control traces. Various techniques for approximate representation of the register-access information, with little or no degradation in performance, are described herein.

For example, the register-access information typically indicates which registers were written to, and possibly the locations in the code of the last write operations to the registers. In some embodiments, the register-access information is approximated by specifying the last-write indications only for a subset of the registers, or not at all. In other embodiments, the register-access information does not necessarily specify the exact instructions in which the last write operations occurred, but rather specifies the location of the last write with a granularity that is coarser that an single instruction.

For example, the processor may divide a given segment into sections, and specify which registers were written to in a given section and not in the following sections. As another example, the last-write indications may possibly indicate code locations that are later than the true locations of the last write operations. For example, the processor may determine the last-write indications regardless of possible branch mis-prediction events, i.e., based at least partly on instructions that will later be flushed because they follow a mis-predicted branch.

In other example embodiments, the processor approximates the scoreboard by generating a single scoreboard for segments having different flow-control traces, or by merging the currently-collected register-access information with one or more previously constructed scoreboards.

Additional examples of scoreboard approximation techniques are described below. The disclosed techniques are tolerant to flow-control variations, simplify the scoreboard construction process, and reduce the memory space needed for storing the scoreboards, with only minor and tolerable degradation in parallelization performance.

System Description

FIG. 1 is a block diagram that schematically illustrates a processor 20, in accordance with an embodiment of the present invention. Processor 20 runs pre-compiled software code, while parallelizing the code execution. Parallelization decisions are performed by the processor at run-time, by analyzing the program instructions as they are fetched from memory and processed.

In the present example, processor 20 comprises an execution pipeline that comprises one or more fetching units 24, one or more decoding units 28, an Out-of-Order (OOO) buffer 32, and execution units 36. Fetching units fetch program instructions from a multi-level instruction cache memory, which in the present example comprises a Level-1 (L1) instruction cache 40 and a Level-2 (L2) instruction cache 44.

A branch prediction unit 48 predicts the flow-control traces (referred to herein as "traces" for brevity) that are expected to be traversed by the program during execution. The predictions are typically based on the addresses or Program-Counter (PC) values of previous instructions fetched by fetching units 24. Based on the predictions, branch prediction unit 48 instructs fetching units 24 which new instructions are to be fetched.

In some embodiments, instructions decoded by decoding units 28 are stored in OOO buffer 32, for out-of-order execution by execution units 36, i.e., not in the order in which they have been compiled and stored in memory. Alternatively, the buffered instructions may be executed in-order. The buffered instructions are then issued for execution by the various execution units 36. In the present example, execution units 36 comprise one or more Multiply-Accumulate (MAC) units, one or more Arithmetic Logic Units (ALU), one or more Load/Store units, and a branch execution unit (BRA). Additionally or alternatively, execution units 36 may comprise other suitable types of execution units, for example Floating-Point Units (FPU).

The results produced by execution units 36 are stored in a register file and/or a multi-level data cache memory, which in the present example comprises a Level-1 (L1) data cache 52 and a Level-2 (L2) data cache 56. In some embodiments, L2 data cache memory 56 and L2 instruction cache memory 44 are implemented as separate memory areas in the same physical memory, or simply share the same memory without fixed pre-allocation.

In some embodiments, processor 20 further comprises a thread monitoring and execution unit 60 that is responsible for run-time code parallelization. The functions of unit 60 are explained in detail below. Monitoring and execution unit 60 is also referred to herein as "monitoring unit" or "monitoring circuitry." In some embodiments, unit 60 is implemented in hardware, either as a standalone unit in processor 20 or distributed among various hardware threads.

In other embodiments, some or all of the functionality of unit 60 may be carried out using run-time software. Such run-time software is typically separate from the software code that is executed by the execution pipeline of processor 20, and may run, for example, on a separate processing core.

The configuration of processor 20 shown in FIG. 1 is an example configuration that is chosen purely for the sake of conceptual clarity. In alternative embodiments, any other suitable processor configuration can be used. For example, in the configuration of FIG. 1, multi-threading is implemented using multiple fetch units 24 and multiple decoding units 28. Each hardware thread may comprise a fetch unit assigned to fetch instructions for the thread and a decoding unit assigned to decode the fetched instructions. Additionally or alternatively, multi-threading may be implemented in many other ways, such as using multiple OOO buffers, separate execution units per thread and/or separate register files per thread. In another embodiment, different threads may comprise different respective processing cores.

As yet another example, the processor may be implemented without cache or with a different cache structure, without branch prediction or with a separate branch prediction per thread. The processor may comprise additional elements such as reorder buffer (ROB), register renaming, to name just a few. Further alternatively, the disclosed techniques can be carried out with processors having any other suitable microarchitecture.

Processor 20 can be implemented using any suitable hardware, such as using one or more Application-Specific Integrated Circuits (ASICs), Field-Programmable Gate Arrays (FPGAs) or other device types. Additionally or alternatively, certain elements of processor 20 can be implemented using software, or using a combination of hardware and software elements. The instruction and data cache memories can be implemented using any suitable type of memory, such as Random Access Memory (RAM).

Processor 20 may be programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Run-Time Code Parallelization Based on Segment Monitoring

In some embodiments, unit 60 in processor 20 identifies a region of the code containing one or more code segments that are at least partially repetitive, and parallelizes execution of these code segments. In the context of the present patent application and in the claims, the term "parallelization" refers to both full and partial parallelization, i.e., any execution scheme that is not purely sequential.

In the context of the present patent application and in the claims, the term "segments that are at least partially repetitive" is used in a broad sense and refers to various possible scenarios in which various segments have some commonality, but do not all necessarily perform the exact same sequence of instructions. Several examples of such segments are described in FIGS. 2A-2C below.

Consider, for example, segments that comprise respective iterations of a program loop, or respective executions of a function or procedure. If the loop or function does not contain conditional branch instructions, the segments are typically repetitive, follow the same control-flow trace and perform the same sequence of instructions.

Typically, unit 60 parallelizes the execution of segments even if the segments are only partially-repetitive. Partially-repetitive segments typically have some commonality but do not necessarily follow the exact same control-flow trace. Partially-repetitive segments may, for example, begin at the same instruction and/or end at the same instruction, but otherwise may follow different traces. Examples of this sort include segments that enter or exit a loop or function at different instructions, or segments that take different branches within a loop or function.

As yet another example, unit 60 may divide a repetitive (or partially repetitive) instruction sequence into two or more successive segments, in addition to parallelizing the execution of the sequence as a whole. This collection of segments is also considered as a set of partially-repetitive segments. An example of such a scenario is illustrated in FIG. 2C below.

Further alternatively, unit 60 may identify and parallelize the execution of any other suitable region of code that comprises any other suitable set of partially-repetitive segments. Generally, data values (e.g., register values) and/or flow-control traces may differ from one segment execution to another.

In the disclosed embodiments, processor 20 parallelizes the execution of segments by invoking multiple hardware threads in parallel or semi-parallel. Each thread executes a respective code segment, e.g., a respective iteration of a loop, multiple (not necessarily successive) loop iterations, part of a loop iteration, continuation of a loop, a function or part or continuation thereof, or any other suitable type of segment.

In the example of FIG. 1, although not necessarily, each thread comprises a respective fetch unit 24 and a respective decoding unit 28 that have been assigned by unit 60 to perform one or more segments. In another example embodiment, a given fetch unit 24 is shared between two or more threads.

In practice, data dependencies exist between segments. For example, a calculation performed in a certain loop iteration may depend on the result of a calculation performed in a previous iteration. The ability to parallelize segments depends to a large extent on such data dependencies.

In some embodiments, unit 60 decides how to parallelize the code by monitoring the instructions in the processor pipeline. In response to identifying a code region that comprises segments that are at least partially repetitive, unit 60 starts monitoring the instructions as they are fetched, decoded and executed by the processor.

Figure 2A:
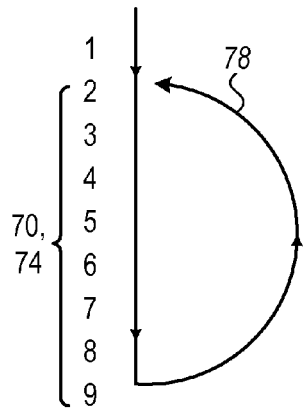
FIGS. 2A-2C are diagrams that schematically illustrate code regions containing at least partially repetitive segments, in accordance with embodiments of the present invention.
Figure 2B:
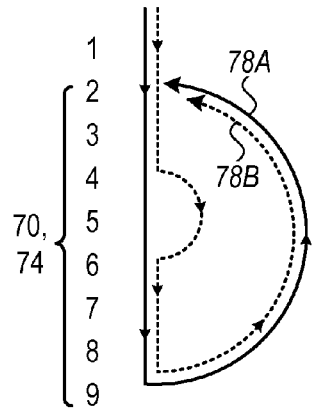
Figure 2C:
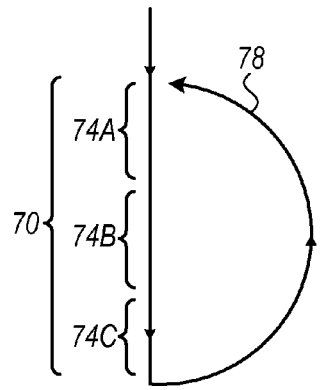

FIGS. 2A-2C are diagrams that schematically illustrate code regions 70 containing at least partially repetitive segments 74 that follow one or more control-flow traces 78, in accordance with embodiments of the present invention. These examples demonstrate several possible types of code regions that can be represented and parallelized using a single approximated scoreboard.

In FIG. 2A, code region 70 contains a loop having a single type of segment 74 that follows a single internal flow-control trace 78. Thus, the various loop iterations correspond to multiple segments that are entirely repetitive and follow the same trace.

In FIG. 2B, code region 70 contains a loop that has an internal conditional branch. As in the previous example, each loop iteration corresponds to a respective segment 74. In the present example, however, different segments may follow different flow-control traces 78A, 78B, depending on the actual branch decision taken in each segment. In this example the segments are only partially-repetitive.

In FIG. 2C, unit 60 divides the loop in code region into multiple successive segment types 74A-74C. Unit may invoke different threads to execute different types of segments within the same loop iteration, in addition to parallelizing the execution of different loop iterations.

In the example of FIG. 2C, the overall loop follows a single trace 78, but different segments types follow different portions of this trace. In other words, segments 74A of various loop iterations are repetitive, as are segments 74B of various loop iterations and segments 74C of various loop iterations. Different segment types, however, follow different traces. This scenario is also considered a set of partially repetitive segments.

Another example scenario may combine the cases of FIGS. 2B and 2C. In such a case, segments 74A, 74B and/or 74C may contain one or more conditional branch instructions. Therefore, segments of a given type may traverse different flow-control traces in various loop iterations. In other words, segments 74A, 74B and/or 74C may be partially-repetitive.

In the example of FIG. 2C, segments 74A, 74B and 74C do not overlap. In alternative embodiments, however, segments 74A, 74B and/or 74C may share one or more overlapping instructions. This case is addressed in greater detail below.

The scenarios of FIGS. 2A-2C above are depicted purely by way of example. In alternative embodiments, unit 60 may monitor the instructions in any other suitable kind of code region that comprises segments that are at least partially repetitive. In some embodiments, unit 60 monitors various segments separately and combines the monitoring results to produce a scoreboard for the entire code region (e.g., entire loop).

In some implementations, the functionality of unit 60 may be distributed among the multiple hardware threads, such that a given thread can be viewed as monitoring its instructions during execution. As noted above, the monitoring unit is also referred to herein as "monitoring circuitry." Nevertheless, for the sake of clarity, the description that follows assumes that monitoring functions are carried out by unit 60.

As noted above, as part of the monitoring process unit 60 generates a monitoring table referred to as a scoreboard. The scoreboard typically comprises some classification of the registers. In addition, for at least some of the registers, the scoreboard may indicate the location in the code of the last write operation to the register.

Any suitable indication may be used to indicate the location of the last write operation, such as a count of the number of write operations to the register or the address of the last write operation. The last-write indication enables unit 60 to determine, for example, when it is permitted to execute an instruction in a subsequent segment that depends on the value of the register.

In some embodiments, as part of the monitoring process, unit 60 also generates the flow-control trace (or traces) traversed by the instructions in the segments of the identified region of the code. Additional aspects of scoreboard generation can be found in U.S. patent application Ser. Nos. 14/578,516, 14/578,518 and 14/583,119, which are assigned to the assignee of the present patent application and whose disclosures are incorporated herein by reference.

Approximate Specification of Partially-Repetitive Code Segments

In some embodiments, unit 60 generates an approximate rather than exact scoreboard for the identified region of the code. Approximation of the specification provides tolerance to flow-control variations in the code region, reduces the computational complexity of generating the scoreboard, and/or reduces the memory space needed for storing the scoreboard. Approximation is particularly advantageous when storing and using multiple scoreboards for parallelizing multiple regions of the code.

The description that follows presents several example techniques for generating an approximated scoreboard. These techniques are depicted purely by way of example. In alternative embodiments, unit 60 may generate any other suitable register-access information in any other suitable way.

In some embodiments, unit 60 indicates in the scoreboard, for at least one of the registers, only whether or not the register was written to, without specifying the location of the last write operation to the register. For example, unit 60 may specify the locations of the last write operations for a subset of the registers. For the remaining registers, unit 60 may only indicate whether each register was written to or not.

In an example embodiment, unit 60 counts the number of write operations to each register. If the number of write operations to a given register does not exceed a predefined threshold, unit 60 records this number in the scoreboard (or records some other indication of the location of the last write operation to the register). If the number of write operations to the given register exceeds the predefined threshold, unit 60 only indicates that the register was written to, without specifying the location of the last write operation. In an embodiment, unit 60 ensures that the approximate number of write operations is higher than the real number of writes.

In other embodiments, unit 60 specifies the location of the last write to the register with some coarse granularity that is coarser than a single instruction, instead of specifying the exact instructions in which the last write operations occurred. In an example embodiment, unit 60 divides a given segment into two or more sections. For each section, unit 60 may specify which registers were written to in that section and not in the subsequent sections. Put in another way, for at least a given register, unit 60 may specify the last section in which the register was written to.

In other embodiments, one or more of the last-write indications in the scoreboard indicate code locations that are possibly later than the true locations of the last write operations. For example, unit 60 may determine the locations of the last write operations based on instructions that possibly follow a mis-predicted branch. In such a case, the last write operation indicated in the scoreboard may later be flushed and not executed, and therefore the true last write operation is some earlier instruction.

In alternative embodiments, unit 60 constructs the scoreboard while considering only instructions that will be executed and not flushed. For example, unit 60 may monitor the instructions after they are committed following execution. As another example, unit 60 may identify mis-prediction events and correct the register-access information in the scoreboard to compensate for the mis-prediction. Example correction techniques are described in U.S. patent application Ser. No. 14/583,119, cited above.

In some embodiments, unit 60 may construct the scoreboard by collecting register-access information from segments that partially overlap. Because of the overlap, some of the register-access information may be duplicate, and therefore approximate. For example, when counting the number of write operations to a given register, if a write command to the register occurs in the overlap between two monitored segments, this instruction will be counted twice.

In an embodiment, unit 60 counts the exact number of write operations to a register, but records a larger number in the scoreboard. This feature provides some protection from flow-control variations and mis-prediction.

In some embodiments, unit 60 approximates the scoreboard by generating a single scoreboard for segments having different flow-control traces. For example, in the scenario of FIG. 2B above, unit 60 may generate a single approximate scoreboard for both the segments that follow trace 78A and the segments that follow trace 78B. In an embodiment, unit 60 may generate a single scoreboard for all monitored traces. In these embodiments, the scoreboard is approximate in the sense that it allows for certain variation in the control-flow trace, rather than corresponding to a single trace.

In some embodiments (e.g., in the example of FIG. 2C) unit 60 may produce the single scoreboard by adding the register-access information (e.g., number of writes) for the various segments. In other embodiments (e.g., in the example of FIG. 2B) unit 60 may produce the single scoreboard by taking the union of the register-access information (e.g., take the largest number of writes) for the various segments.

In some of these embodiments, unit 60 associates the same approximate scoreboard with two or more different traces. In an alternative embodiment, unit 60 generates a relaxed trace that comprises more than one branch option, and associates the relaxed trace with the approximated scoreboard. In some embodiments, unit 60 may merge the currently-collected register-access information with one or more previously constructed scoreboards.

When dividing a monitored segment into sections and monitoring each section separately (e.g., in FIG. 2C), the various sections may be monitored using two or more hardware threads.

In some cases, the classification of a given register may differ from one monitored segment to another in the code region. Unit 60 may use various rules or logic for deciding how to classify such a register in the composite scoreboard generated for the code region. In the scenario of FIG. 2B, for example, if a given register was classified as Global (G) in one segment and as Global-Local (GL) in another segment, unit 60 would typically classify the register as GL in the combined scoreboard. As another example, in the scenario of FIG. 2C, if a given register was not used at all in one segment and classified in a certain class in another segment, unit 60 would typically classify the register using the same class in the combined scoreboard.

In various embodiments, unit 60 may collect the register-access information based on the output of any suitable stage of the execution pipeline, and generate the corresponding trace or traces based on the output of any suitable stage of the execution pipeline. Trace generation and collection of register-access information need not be performed at the same pipeline stage. Generally speaking, monitoring instructions early in the pipeline helps to invoke parallel execution more quickly and efficiently, but on the other hand is more affected by mis-prediction. Monitoring instructions later in the pipeline causes slower parallelization, but is on the other hand less sensitive to mis-prediction.

In some embodiments, unit 60 collects the register-access information (e.g., classification of registers and locations of last write operations to registers) at the output of decoding units 28, i.e., from the instructions being decoded. In another embodiment, unit 60 collects the register-access information based on the instructions being executed in execution units 36, but before the instructions and results are finally committed. In an alternative embodiment, unit 60 collects the register-access information based only on the instructions that are committed, i.e., without considering instructions that are flushed due to mis-prediction.

In some embodiments, unit 60 generates the trace or traces from the branch instructions being fetched, i.e., based on the branch instructions at the output of fetching units 24 or branch prediction unit 48. In alternative embodiments, unit 60 generates the trace from the branch instructions being decoded, i.e., based on the branch instructions at the output of decoding units 28. In other embodiments, unit 60 generates the trace or traces after evaluating the conditions of conditional branch instructions by the branch execution (BRA) unit, i.e., at a stage where the branch instructions are no longer conditional. Further alternatively, unit 60 may generate the trace or traces based on branch instructions being committed.

In some embodiments, the program code indicates at least one register for which the register-access information in the scoreboard is permitted to be approximate, and at least one register for which the register-access information should be exact. Unit 60 may select, based on these indications, which registers to specify exactly and which registers to specify approximately in the scoreboard.

Further additionally or alternatively, unit 60 may generate the flow-control trace and/or collect the register-access information based on any other suitable pipeline stages.

Figure 3:
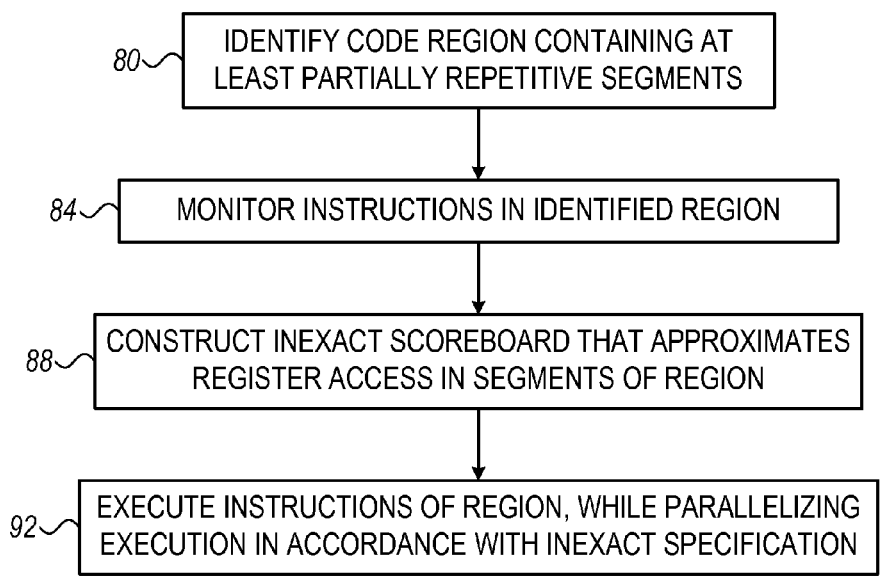
FIG. 3 is a flow chart that schematically illustrates a method for run-time code parallelization using inexact instruction monitoring, in accordance with an embodiment of the present invention.

FIG. 3 is a flow chart that schematically illustrates a method for run-time code parallelization using inexact instruction monitoring, in accordance with an embodiment of the present invention. The method begins with unit 60 identifying, at run-time, a region of the program code containing at least partially repetitive code segments, at a region identification step 80.

Unit 60 monitors the instructions in the identified region, at a monitoring step 84. Based on the monitored instructions, unit 60 constructs an approximate scoreboard that approximates the register-access information of the segments in the region, at a scoreboard construction step 88. At a parallelization step 92, unit 60 uses the approximate scoreboard for parallelizing the execution of the segments in the region.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
in a processor that executes instructions of program code, identifying a region of the code containing one or more segments of the instructions that are at least partially repetitive;
monitoring the instructions in the region, and constructing at runtime for the region an approximate specification, which specifies at least identities of one or more registers that are written-to by the monitored instructions; and
parallelizing execution of the segments in the region based at least on the identities of the registers that are written-to, as specified in the approximate specification.

2. The method according to claim 1, wherein identifying the region comprises selecting multiple segments having at least one of a common starting point and a common ending point in the code, and wherein constructing the approximate specification comprises constructing the same specification to specify register access information in the multiple selected segments.

3. The method according to claim 1, wherein identifying the region comprises identifying a program loop or a function.

4. The method according to claim 1, wherein the approximate specification is associated with a flow-control trace traversed by the instructions in the segments.

5. The method according to claim 1, wherein the approximate specification is associated with multiple alternative flow-control traces traversed by the instructions in the segments.

6. The method according to claim 1, wherein constructing the approximate specification comprises indicating in the specification the identities of the registers accessed by the instructions, but not locations of last write operations to the registers.

7. The method according to claim 1, wherein constructing the approximate specification comprises:
for one or more first registers, specifying locations in the code of respective last write operations to the first registers; and
for one or more second registers, specifying whether the second registers were written to, but not the locations of the last write operations to the second registers.

8. The method according to claim 7, wherein the first registers comprise the registers written to up to a predefined number of times, and wherein the second registers comprise the registers written to more than the predefined number of times.

9. The method according to claim 1, wherein constructing the approximate specification comprises selecting, based on indications embedded in the program code, at least a first register for which the specification is to be approximate, and at least a second register for which the specification is to be exact.

10. The method according to claim 1, wherein constructing the approximate specification comprises dividing a monitored segment into sections, and, for each section, specifying the registers that were written to in the section and not written to in subsequent sections.

11. The method according to claim 1, wherein constructing the approximate specification comprises dividing a monitored segment into sections, and monitoring the sections using two or more hardware threads.

12. The method according to claim 1, wherein constructing the approximate specification comprises, for each register in the specification, specifying an approximate location in the code of a last write operation to the register, which is no earlier than an accurate location of the last write operation.

13. The method according to claim 12, wherein specifying the approximate location comprises specifying an approximate number of write commands to the register that is no less than an accurate number of the write commands to the register.

14. The method according to claim 12, wherein specifying the approximate location comprises determining the approximate location based on one or more instructions following a branch that was mis-predicted during monitoring of the instructions.

15. The method according to claim 1, wherein constructing the approximate specification comprises collecting register access information regardless of possible overlap between the segments in the region.

16. The method according to claim 1, wherein constructing the approximate specification comprises merging register access information with one or more previously-collected specifications.

17. The method according to claim 1, wherein constructing the approximate specification comprises merging register-access information that was collected in two or more of the segments.

18. The method according to claim 17, wherein merging the register-access information comprises summing, or taking a maximum of, respective counts of write operations from the two or more segments.

19. The method according to claim 17, wherein merging the register-access information comprises merging respective classifications of registers from the two or more segments.

20. The method according to claim 1, and comprising correcting the approximate specification to compensate for branch mis-prediction occurring in the monitored instructions.

21. The method according to claim 1, wherein constructing the approximate specification comprises collecting register access information based on at least one of:
instructions being decoded in an execution pipeline of the processor;
instructions being executed in the execution pipeline; and
instructions being committed in the execution pipeline.

22. The method according to claim 1, wherein monitoring the instructions comprises generating at least one flow-control trace of the monitored instructions based on at least one of:
  instructions being fetched from memory in an execution pipeline of the processor;
  instructions being decoded in the execution pipeline; and
  instructions being executed in the execution pipeline, or based on instructions being committed in the execution pipeline.

23. A processor, comprising:
  an execution pipeline, which is configured to execute instructions of program code; and
  a monitoring unit, which is configured to identify a region of the code containing one or more segments of the instructions that are at least partially repetitive, to monitor the instructions in the region and construct at runtime for the region an approximate specification, which specifies at least identities of one or more registers that are written-to by the monitored instructions, and to parallelize execution of the segments in the region based at least on the identities of the registers that are written-to, as specified in the approximate specification.

24. The processor according to claim 23, wherein the approximate specification is associated with multiple alternative flow-control traces traversed by the instructions in the segments.

25. The processor according to claim 23, wherein the monitoring unit is configured to specify, for each register in the specification, an approximate location in the code of a last write operation to the register, which is no earlier than an accurate location of the last write operation.

26. The processor according to claim 25, wherein the monitoring unit is configured to specify the approximate location by specifying an approximate number of write commands to the register that is no less than an accurate number of the write commands to the register.

27. The processor according to claim 23, wherein the monitoring unit is configured to construct the approximate specification by merging register-access information that was collected in two or more of the segments.

28. The processor according to claim 23, wherein the monitoring unit is configured to collect register access information regardless of possible overlap between the segments in the region.

29. The processor according to claim 23, wherein the monitoring unit is configured to construct the approximate specification by collecting register access information based on at least one of:
  instructions being decoded in the execution pipeline;
  instructions being executed in the execution pipeline; and
  instructions being committed in the execution pipeline.

30. The processor according to claim 23, wherein the monitoring unit is configured to generate at least one flow-control trace of the monitored instructions based on at least one of:
  instructions being fetched from memory in the execution pipeline;
  instructions being decoded in the execution pipeline; and
  instructions being executed in the execution pipeline, or based on instructions being committed in the execution pipeline.

* * * * *